United States Patent
Satterlee et al.

(10) Patent No.: US 8,923,314 B2
(45) Date of Patent: *Dec. 30, 2014

(54) SYSTEM AND METHOD TO ROUTE DATA IN AN ANYCAST ENVIRONMENT

(71) Applicant: AT&T Intellectual Property I, L.P., Atlanta, GA (US)

(72) Inventors: Michael Satterlee, Clifton Park, NY (US); John F. Gibbons, Ballstone Lake, NY (US); Neal A. Shackleton, Tierra Verde, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/954,087

(22) Filed: Jul. 30, 2013

(65) Prior Publication Data

US 2013/0315067 A1 Nov. 28, 2013

Related U.S. Application Data

(63) Continuation of application No. 13/040,753, filed on Mar. 4, 2011, now Pat. No. 8,498,303, which is a continuation of application No. 12/255,249, filed on Oct. 21, 2008, now Pat. No. 7,924,830.

(51) Int. Cl.
*H04L 12/28* (2006.01)
*H04L 12/715* (2013.01)
*H04L 29/08* (2006.01)

(52) U.S. Cl.
CPC ............ *H04L 67/1002* (2013.01); *H04L 45/04* (2013.01)
USPC ........................................ 370/401

(58) Field of Classification Search
USPC .................. 370/238, 328, 338, 389, 392, 401
See application file for complete search history.

(56) References Cited

U.S. PATENT DOCUMENTS

| | | | |
|---|---|---|---|
| 7,185,107 B1 | 2/2007 | Cassar | |
| 7,512,702 B1 | 3/2009 | Srivastava et al. | |
| 7,522,603 B2 | 4/2009 | Vasseur | |
| 7,676,595 B2 * | 3/2010 | Ettikan | 709/238 |
| 7,769,886 B2 | 8/2010 | Naseh et al. | |
| 7,796,607 B2 * | 9/2010 | Gerber et al. | 370/395.31 |
| 7,797,426 B1 * | 9/2010 | Lyon | 709/226 |
| 7,830,896 B2 | 11/2010 | Srivastava et al. | |
| 8,280,992 B2 * | 10/2012 | Yao et al. | 709/222 |

(Continued)

OTHER PUBLICATIONS

"Anycast," from Wikipedia, Aug. 25, 2008, http://en.wikipedia.org/wiki/Anycast, pp. 1-4.

(Continued)

*Primary Examiner* — Andrew Lai
*Assistant Examiner* — Andrew C Lee
(74) *Attorney, Agent, or Firm* — Akerman LLP; Michael K. Dixon; Roy P. Zachariah

(57) ABSTRACT

A method of routing data in a network includes sending an instruction to a router to statically route outbound traffic to a firewall farm having an anycast address, identifying prefixes of endpoints that communicate with router, instructing a firewall router to send a route advertisement to the network announcing that the firewall router is the subsequent best hop for data bound for the endpoints, detecting a change in network condition, and sending another instruction to the router to route outbound traffic to another firewall farm having the anycast address after detecting the change.

20 Claims, 6 Drawing Sheets

(56) References Cited

U.S. PATENT DOCUMENTS

| | | | |
|---|---|---|---|
| 2004/0107234 A1* | 6/2004 | Rajahalme | 709/200 |
| 2004/0148520 A1 | 7/2004 | Talpade et al. | |
| 2004/0165565 A1 | 8/2004 | Omae et al. | |
| 2004/0205211 A1 | 10/2004 | Takeda et al. | |
| 2004/0249973 A1* | 12/2004 | Alkhatib et al. | 709/245 |
| 2005/0044141 A1* | 2/2005 | Hameleers et al. | 709/204 |
| 2005/0089015 A1 | 4/2005 | Tsuge et al. | |
| 2005/0243766 A1 | 11/2005 | Tsirtsis | |
| 2006/0036761 A1 | 2/2006 | Amra et al. | |
| 2006/0037072 A1* | 2/2006 | Rao et al. | 726/14 |
| 2006/0195607 A1 | 8/2006 | Naseh et al. | |
| 2006/0209885 A1 | 9/2006 | Hain et al. | |
| 2006/0253900 A1 | 11/2006 | Paddon et al. | |
| 2007/0019545 A1* | 1/2007 | Alt et al. | 370/230 |
| 2007/0022289 A1 | 1/2007 | Alt et al. | |
| 2007/0064613 A1 | 3/2007 | Qian et al. | |
| 2007/0153763 A1 | 7/2007 | Rampolia et al. | |
| 2007/0217419 A1 | 9/2007 | Vasseur | |
| 2007/0233887 A1* | 10/2007 | Nubani et al. | 709/230 |
| 2007/0274232 A1* | 11/2007 | Axelsson et al. | 370/254 |
| 2008/0080513 A1 | 4/2008 | Kang et al. | |
| 2008/0123640 A1 | 5/2008 | Bhatia et al. | |
| 2008/0186968 A1 | 8/2008 | Farinacci et al. | |
| 2008/0235400 A1 | 9/2008 | Slocombe et al. | |
| 2008/0313450 A1 | 12/2008 | Rosenberg | |
| 2009/0006647 A1 | 1/2009 | Balonado et al. | |
| 2009/0016343 A1* | 1/2009 | Jimmei | 370/389 |
| 2009/0157901 A1 | 6/2009 | Asati et al. | |
| 2009/0201800 A1 | 8/2009 | Naseh et al. | |
| 2010/0080234 A1 | 4/2010 | Borkenhagen et al. | |

OTHER PUBLICATIONS

"Stateful firewall," from Wikipedia, Aug. 25, 2008, http://en.wikipedia.org/wiki/Stateful.sub.--firewall, pp. 1-3.

* cited by examiner

SYSTEM AND METHOD TO ROUTE DATA IN AN ANYCAST ENVIRONMENT

CROSS-REFERENCE TO RELATED APPLICATIONS

This application is a continuation of U.S. patent application Ser. No. 13/040,753 filed on Mar. 4, 2011, now U.S. Pat. No. 8,498,303, which is a continuation of U.S. patent application Ser. No. 12/255,249 filed on Oct. 21, 2008, now U.S. Pat. No. 7,924,830, both of which are hereby incorporated by reference in their entirety.

FIELD OF THE DISCLOSURE

The present disclosure generally relates to communications networks, and more particularly relates to routing data in an anycast environment.

BACKGROUND

Anycast is a network addressing and routing scheme whereby multiple servers used to provide a given application use the same anycast Internet protocol address, despite being in different physical locations. The anycast network infrastructure routes data packets that are associated with a service from a client to a nearest location of the service, according to the network topology. Anycast can be used to load balance traffic across multiple service nodes while providing optimal routing to the nearest point on the network having the anycast IP address.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
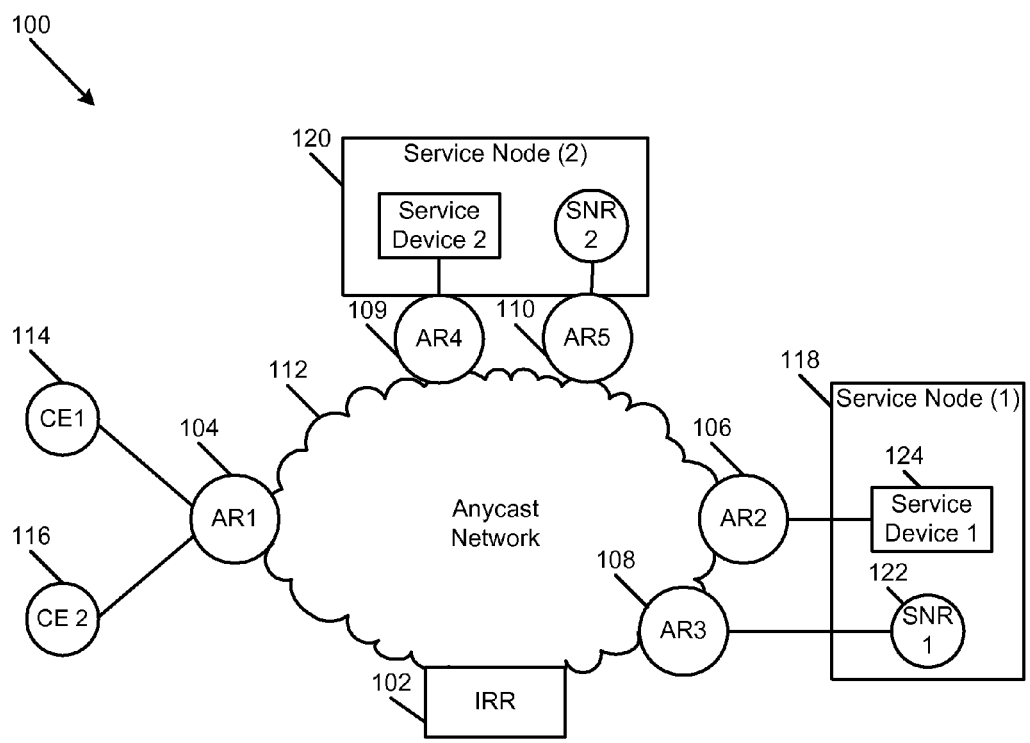
FIG. 1 is a block diagram illustrating a particular embodiment of a system to route data in an anycast environment.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed systems, methods or computer-readable media. Moreover, some statements may apply to some inventive features but not to others.

In one embodiment, a method of routing data in an anycast environment includes sending an instruction from an intelligent route reflector device (IRR) to an anycast router associated with an anycast network. The instruction signals the anycast router to statically pin up to an initial service node corresponding to a network service. The initial service node is associated with an anycast address. The method also includes identifying prefixes of Internet protocol addresses of customer endpoints that communicate with the anycast network via the anycast router. Further, the method includes sending a route advertisement to a service node router associated with the initial service node. The route advertisement instructs the service node router to send an advertisement to the anycast network announcing that the service node router is a next best hop for data traffic that is related to the network service and that is bound for a customer endpoint having an IP address that includes any of the identified prefixes.

In another embodiment, a system to route data in an anycast environment includes an intelligent route reflector device (IRR) that includes processing logic and memory accessible to the processing logic. The memory includes instructions executable by the processing logic to send an instruction to an anycast router associated with an anycast network to which the IRR is coupled. The instruction signals the anycast router to statically pin up to an initial firewall farm associated with an anycast Internet protocol address. The memory also includes instructions executable by the processing logic to identify prefixes of IP addresses of customer endpoints that communicate with the anycast network via the anycast router. Further, the memory includes instructions executable by the processing logic to send a route advertisement to a firewall router associated with the initial firewall farm. The route advertisement instructs the firewall router to send an advertisement to the anycast network announcing that the firewall router is a next best hop for data traffic that is bound for a customer endpoint having an IP address that includes any of the identified prefixes.

In another embodiment, a computer-readable medium includes processor-readable instructions that are executable by processing logic to perform a method. The method includes determining that an anycast router associated with an anycast network routes data to an initial service node corresponding to a network service, from customer endpoints that communicate with the anycast network via the anycast router. The initial service node is associated with an anycast Internet protocol address. The method also includes identifying prefixes of IP addresses of the customer endpoints. Further, the method includes sending a route advertisement to a service node router associated with the initial service node. The route advertisement instructs the service node router to send an advertisement to the anycast network announcing that the service node router is a next best hop for data traffic that is related to the network service and that is bound for a customer endpoint having an IP address that includes any of the identified prefixes.

FIG. 1 illustrates a particular embodiment of a system 100 to route data in an anycast environment. The system 100 includes an intelligent route reflector device (IRR) 102 that is adapted to communicate with a plurality of anycast routers AR1 104, AR2 106, AR3 108, AR4 109 and AR5 110 via an anycast network 112, such as a transport Internet protocol/Multi Protocol Label Switching (IP/MPLS) network. Customer endpoints CE1 114 and CE2 116 are adapted to communicate with service node (1) 118 and service node (2) 120 via the anycast routers 104-110 and the anycast network 112. Each service node can include a service node router such as SNR1 122, and a service device 124 such as an application server, a firewall, or another service device. In another embodiment, each service node can include more than one service node router, more than one service device, or a combination thereof.

Each of the service nodes 118, 120 is adapted to provide various instances of a same network service to the customer endpoints CE1 114 and CE2 116. Further, the service nodes 118, 120 are each associated with a same IP address (an anycast address). In one embodiment, the network service can include a connection-oriented, or stateful, application or service, in which an entire session utilizes a same server, firewall, other service device, or combination thereof. Examples of stateful network services include transmission control protocol (TCP), file transfer protocol (FTP), hypertext transfer protocol (HTTP), video conferencing services, virtual private network (VPN) services, Voice-over IP, or another network service employing stateful packet inspection.

In a particular embodiment, the IRR 102 is adapted to send an instruction to the anycast router AR1 104, where the instruction signals the anycast router AR1 104 to pin up to the service node (1) 118 statically or via other methods. Thus, outbound traffic related to the network service from the customer endpoints 114, 116 will be routed to the service node (1) 118. The IRR 102 is also adapted to identify IP address prefixes of the customer endpoints CE1 114 and CE2 116 communicating with the anycast network 112 via the anycast router AR1 104. For example, the IP address prefix of CE1 114 can be represented as x.x.x.x., and the IP address prefix of CE2 116 can be represented as y.y.y.y. The IRR 102 can be adapted to identify the IP address prefixes of the customer endpoints through manual entry; dynamically through direct signaling sessions between the IRR 102 and AR1 104; dynamically through direct signaling sessions between the IRR 102 and the customer endpoints 114, 116; or any combination thereof.

The IRR 102 is adapted to generate and send a route advertisement instructing the service node router SNR1 122 to send an advertisement to the anycast network 112 announcing that SNR1 122 is a next best hop for data related to the network service that is bound for customer endpoints having any of the IP address prefixes x.x.x.x. and y.y.y.y. For instance, SNR1 122 can send the route advertisement to AR3 108. Thus, return traffic that is related to the network service, and that is destined for a customer endpoint having an IP address with a prefix x.x.x.x. or y.y.y.y., is routed through the service node (1) 118.

In one embodiment, the anycast routers 104-110 can correspond to separate logical domains, despite using the same anycast network 112. For instance, AR2 106 can correspond to an MPLS virtual private network (VPN) service, whereas AR3 108 can correspond to an Internet service.

In some instances, it may be necessary to provide the network service to the customer endpoints 114, 116 via another service node, such as the service node (2) 120. For example, one or more elements of the service node (1) 118, or one or more network elements that comprise a path to the service node (1) 118, can become congested or fail. As a result, the IRR 102 can be adapted to detect such a changed network condition, and send another instruction signaling the anycast router AR1 104 to pin up to another service node having the anycast address associated with the service node (1) 118, such as the service node (2) 120. As a result, outbound traffic related to the network service from the customer endpoints 114, 116 will be routed to the service node (2) 120. In one embodiment, the IRR 102 can select the service node (2) 120 from a plurality of other service nodes that provide the network service according to one or more load-balancing rules, other selection criteria or a combination thereof. Such load-balancing rules may account for factors such as network conditions, load jitter, packet loss, time of day, or other factors.

In addition, the IRR 102 is adapted to send an instruction to the service node router SNR1 122 to stop advertising that the service node router SNR1 122 is the next best hop for the customer endpoints communicating with the anycast router AR1 104. Further, the IRR 102 is adapted to send another route advertisement instructing another service node router at the service node (2) 120 to send an advertisement to the anycast network 112 (e.g., to AR5 110) announcing that the other service node router is a next best hop for one or more customer endpoints having any of the identified IP address prefixes x.x.x.x. and y.y.y.y., with respect to the network service. As a result, return traffic that is related to the network service and destined for a customer endpoint having an IP address with a prefix x.x.x.x. or y.y.y.y. is routed through the service node (2) 120.

In another embodiment, the anycast routers 104-110 can correspond to separate logical domains, despite using the same anycast network 112. For instance, anycast routers AR2 106 and AR4 109 can correspond to a first service context, such as an MPLS virtual private network (MPLS VPN) service, whereas anycast routers AR3 108 and AR5 110 can correspond to a second service context, such as an Internet service. The IRR 102 can be adapted to send a route advertisement instructing the service node router (1) 118 to send an advertisement to AR3 108, or AR5 110 when a change in a network condition occurs, announcing that SNR1 122 is a next best hop for Internet traffic from customer endpoints that have identified IP address prefixes x.x.x.x. and y.y.y.y. and that have requested the Internet service. Conversely, the IRR 102 can be adapted to send a route advertisement instructing the service node router (1) 118 to send an advertisement to AR2 106, or AR4 109 when a change in a network condition occurs, announcing that SNR1 122 is a next best hop for VPN traffic from customer endpoints that have identified IP address prefixes x.x.x.x. and y.y.y.y. and that have requested the VPN service.

Figure 2:
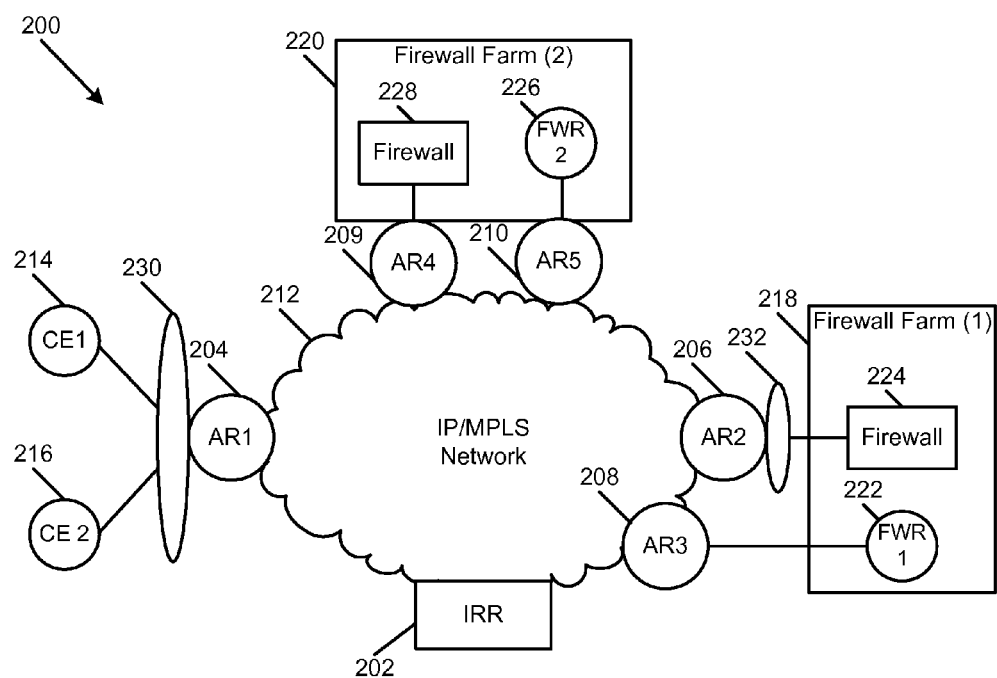
FIG. 2 is a block diagram illustrating a second particular embodiment of a system to route data in an anycast environment.

FIG. 2 illustrates a second particular embodiment of a system 200 to route data in an anycast environment. The system 200 includes an intelligent route reflector device (IRR) 202 that is adapted to communicate with a plurality of anycast routers AR1 204, AR2 206, AR3 208, AR4 209 and AR5 210 via a network, such as the IP/MPLS network 212. Customer endpoints CE1 214 and CE2 216 are adapted to communicate with Firewall Farm (1) 218 and Firewall Farm (2) 220 via the anycast routers 204-210 and the IP/MPLS network 212. Firewall Farm (1) 218 can include a firewall router, such as FWR1 222 and a firewall 224. Firewall Farm (2) 220 can include another firewall router FWR2 226 and another firewall 228.

The Firewall Farms 218 and 220 can be included in a plurality of firewall farms that are adapted to provide various instances of a shared firewall service to customer endpoints, such as the customer endpoints CE1 214 and CE2 216. Each of the plurality of firewall farms, including the Firewall Farms 218 and 220, is associated with a same IP address (an anycast address). In one embodiment, each of the Firewall Farms 218 and 220 can include a common service VRF, such as the VRF 232, that allows specific customers communicating with AR1 204 to route via a service gateway.

In a particular embodiment, the IRR 202 is adapted to determine that outbound traffic from the customer endpoints 214 and 216 is being routed from the anycast router AR1 204 through the firewall 224 at the Firewall Farm (1) 218. For example, the IRR 202 can obtain routing information from a routing table 230, such as a virtual routing and forwarding (VRF) routing table, associated with the anycast router AR1 204. In another example, the IRR 202 can be adapted to intelligently determine that outbound traffic from the customer endpoints 214 and 216 is being routed through the Firewall Farm (1) 218 by monitoring traffic on the IP/MPLS network 212. The IRR 202 can be adapted to map the anycast router AR1 204 to the Firewall Farm (1) 218.

Further, the IRR 202 is adapted to identify IP address prefixes of the customer endpoints CE1 214 and CE2 216 communicating with the anycast router AR1 204. For example, the IP address prefix of CE1 214 can be represented as x.x.x.x. and the IP address prefix of CE2 216 can be represented as y.y.y.y. The IRR 202 is adapted to generate and send a route advertisement instructing the firewall router FWR1 222 to send an advertisement to the IP/MPLS network 212 (such as to AR3 208) announcing that FWR1 222 is a next best hop one or more customer endpoints having any of the identified IP address prefixes x.x.x.x. and y.y.y.y., with respect to the network service. As a result, return traffic that is related to the network service and destined for a customer endpoint having an IP address with a prefix x.x.x.x. or y.y.y.y. is routed through the firewall 224 at the Firewall Farm (1) 218.

In some instances, network conditions may change that cause the anycast router AR1 204 to route outbound traffic from the customer endpoints 214 and 216 through a firewall at another firewall service node, such as the Firewall Farm (2) 220. For example, one or more elements of the Firewall Farm (1) 218, or one or more network elements that comprise a path to the Firewall Farm (1) 218, can become congested or fail. The IRR 202 can be adapted to determine that such changes have occurred in network conditions, that the anycast router AR1 204 is routing traffic to the Firewall Farm (2) 220, or a combination thereof. In response to such determinations, the IRR 202 is adapted to map the anycast router AR1 204 to the service node (2) 220. Further, the IRR 202 is adapted to instruct the firewall router FWR1 222 to stop advertising that it is a next best hop for the customer endpoints having any of the identified IP address prefixes.

In addition, the IRR 202 is adapted to send a route advertisement instructing another firewall router FWR2 226 associated with the other Firewall Farm (2) 220 to send an advertisement to the IP/MPLS network 212 (such as to AR5 210) announcing that the other firewall router FWR2 226 is a next best hop for data bound for customer endpoints having any of the identified IP address prefixes. As a result, return traffic that is destined for a customer endpoint having an IP address with a prefix of x.x.x.x. or y.y.y.y. is routed through the firewall 228 at the Firewall Farm (2) 220.

In another embodiment, the anycast routers 204-210 can correspond to separate logical domains, despite using the same IP/MPLS network 212. For instance, anycast routers AR2 206 and AR4 209 can correspond to a first service context, such as an MPLS virtual private network (MPLS VPN) service, whereas anycast routers AR3 208 and AR5 210 can correspond to a second service context, such as an Internet service. The IRR 202 can be adapted to send a route advertisement instructing the service node router (1) 218 to send an advertisement to AR3 208, or AR5 210 when a change in a network condition occurs, announcing that SNR1 222 is a next best hop for Internet traffic from customer endpoints that have identified IP address prefixes x.x.x.x. and y.y.y.y. and that have requested the Internet service. Conversely, the IRR 202 can be adapted to send a route advertisement instructing the service node router (1) 218 to send an advertisement to AR2 206, or AR4 209 when a change in a network condition occurs, announcing that SNR1 222 is a next best hop for VPN traffic from customer endpoints that have identified IP address prefixes x.x.x.x. and y.y.y.y. and that have requested the VPN service.

Figure 3:
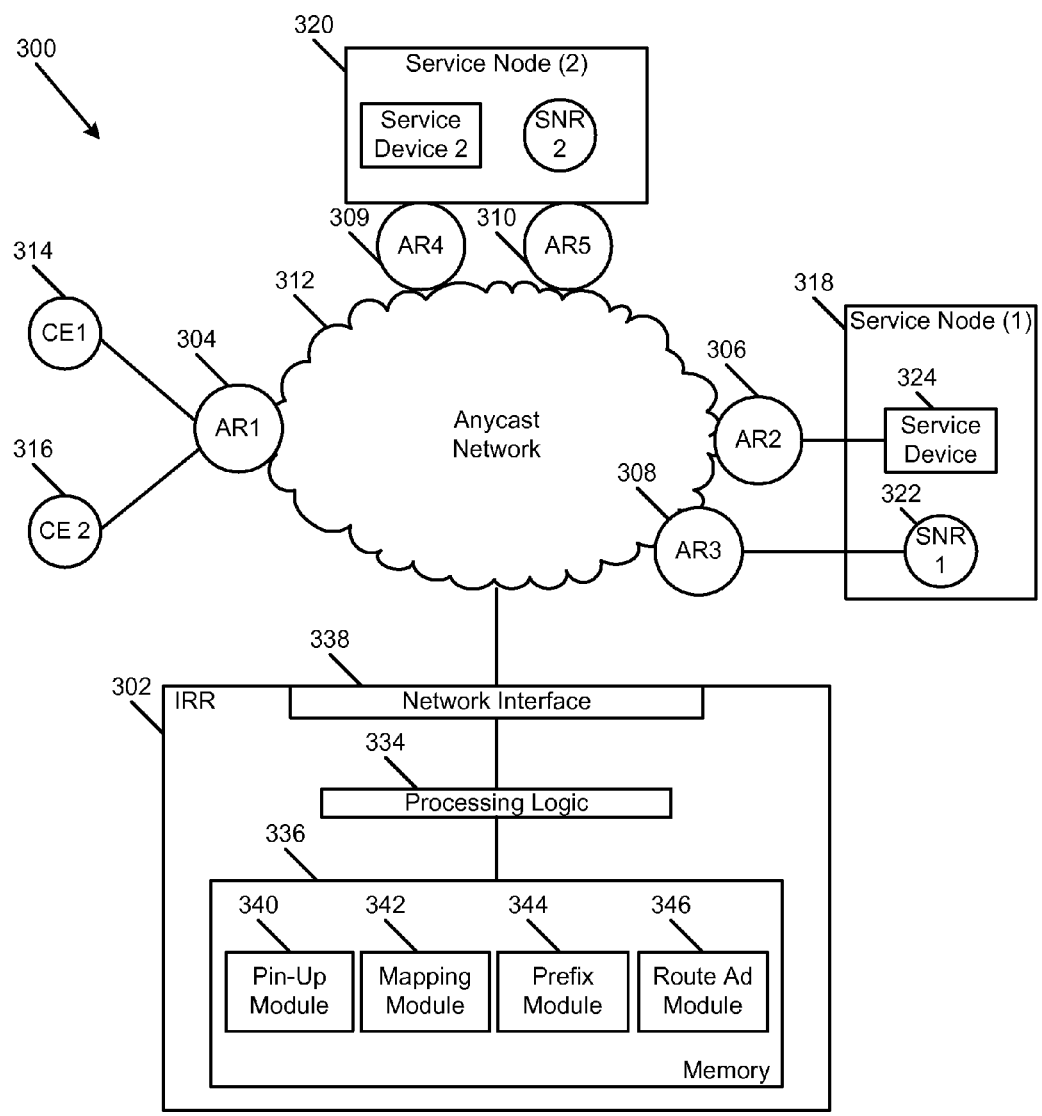
FIG. 3 is a block diagram illustrating a third particular embodiment of a system to route data in an anycast environment.

FIG. 3 illustrates a third particular embodiment of a system 300 to route data in an anycast environment. The system 300 includes an intelligent route reflector device (IRR) 302 that is adapted to communicate with a plurality of anycast routers AR1 304, AR2 306, AR3 308, AR4 309 and AR5 310 via an anycast network 312, such as an IP/MPLS network. Customer endpoints CE1 314 and CE2 316 are adapted to communicate with service node (1) 318 and service node (2) 320 via the anycast routers 304-310 and the anycast network 312. Each service node can include a service node router, such as SNR1 322 and a service device 324, such as an application server, a firewall, or another service device. In another embodiment, a service node can include more than one service node router, more than one service device, or a combination thereof. Each of the service nodes 318, 320 is adapted to provide various instances of a same network service to the customer endpoints CE1 314 and CE2 316. Further, the service nodes 318, 320 are each associated with a same IP address (an anycast address).

The IRR 302 includes processing logic 334 and memory 336 accessible to the processing logic 334. In addition, the IRR 302 includes a network interface 338 adapted to facilitate communication between the IRR 302 and the anycast network 312. In a particular embodiment, the memory 336 includes a plurality of modules 340-346. The modules 340-346 can include computer instructions that are readable and executable by the processing logic 334 to implement various functions of the IRR 302 with respect to routing data in an anycast environment. For example, the modules 340-346 can represent various aspects of one or more software applications, operating systems, or other computer programs. In other embodiments, the modules 340-346 can be implemented as hardware logic or a combination of hardware logic and computer instructions.

For example, the memory 336 can include a pin-up module 340 that is executable by the processing logic 334 to send an instruction to the anycast router AR1 304 signaling the anycast router AR1 304 to pin up to service node (1) 318. In addition, the pin-up module 340 is executable by the processing logic 334 to send another instruction signaling the anycast router AR1 304 to pin up to another service node having the anycast address associated with the service node (1) 318, such as the service node (2) 320. In one embodiment, the pin-up module 340 can be executable by the processing logic 334 to select the service node (2) 320 from a plurality of other service nodes that provide the network service according to one or more load-balancing rules, other selection criteria or a combination thereof.

In another embodiment, the memory 336 can include a mapping module 342 that is executable by the processing logic 334 to determine that outbound traffic from the customer endpoints 314, 316 is being routed from the anycast router AR1 304 to the service node (1) 318. For example, the mapping module 342 can be executable by the processing logic 334 to obtain routing information from a routing table associated with the anycast router AR1 304. In another example, the mapping module 342 can be executable by the processing logic 334 to intelligently determine that outbound traffic from the customer endpoints 314, 316 is being routed through the service node (1) 318 by monitoring traffic on the anycast network 312.

The mapping module 342 is executable by the processing logic 334 to map the anycast router AR1 304 to the service node (1) 318. In addition, the mapping module 342 can be executable by the processing logic 334 to determine that changes have occurred in network conditions, that the anycast router AR1 304 is routing traffic to the service node (2) 320, or a combination thereof. The mapping module 342 is executable by the processing logic 334 to map the anycast router AR1 304 to the service node (2) 320.

Further, the memory 336 can include a prefix module 344 that is executable by the processing logic 334 to identify IP address prefixes of the customer endpoints CE1 314 and CE2 316 communicating with the anycast router AR1 304. Additionally, the memory 336 can include a route advertisement module 346 that is executable by the processing logic 334 to generate and send a route advertisement instructing the service node router SNR1 322 to send an advertisement to the anycast network 312 announcing that SNR1 322 is a next best hop for one or more customer endpoints having any of the identified IP address prefixes x.x.x.x. and y.y.y.y., with respect to the network service, when the anycast router AR1 304 is pinned up to the service node (1) 318.

After the IRR 302 signals the AR1 304 to pin up to the service node (2) 320, or after the IRR determines that the AR1 304 is routing data from the customer endpoints 314, 316 to the service node (2) 320, the route advertisement module 346 is executable by the processing logic 334 to instruct the service node router SNR1 322 to stop advertising that it is a next best hop for the customer endpoints having the identified IP address prefixes. Moreover, the route advertisement module 346 is executable by the processing logic 334 to send a route advertisement instructing another service node router at the service node (2) 320 to send an advertisement to the anycast network 312 announcing that the other service node router is a next best hop for data related to the network service that is bound for customer endpoints having any of the identified IP address prefixes.

Figure 4:
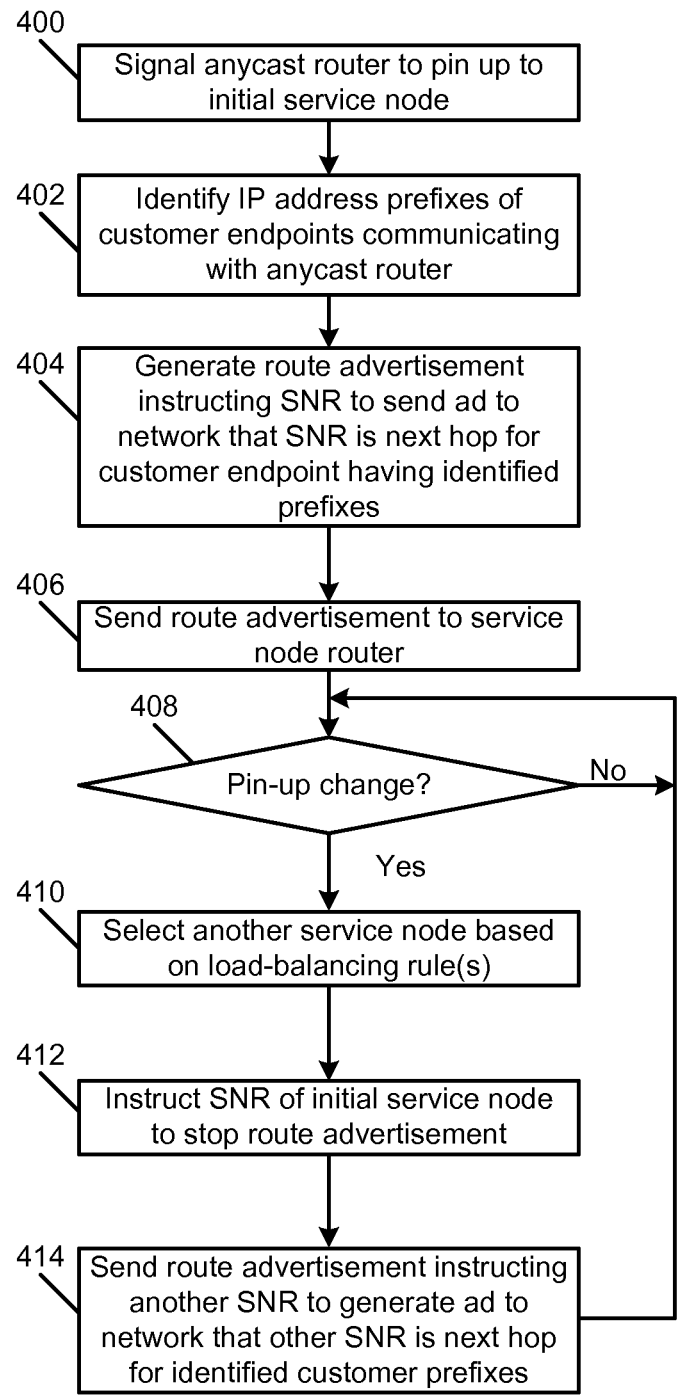
FIG. 4 is a flow diagram illustrating a particular embodiment of a method of routing data in an anycast environment.

FIG. 4 illustrates a particular embodiment of a method of routing data in an anycast environment. At block 400, an intelligent route reflector device (IRR) sends an instruction to an anycast router, signaling the anycast router to statically pin up to an initial service node. The anycast router facilitates communication between a plurality of customer endpoints and a network. Moving to block 402, the IRR identifies IP address prefixes of customer endpoints communicating with the anycast network via the anycast router. Proceeding to block 404, the IRR generates a route advertisement instructing a service node router associated with the initial service node to send an advertisement to the network announcing that the service node router is a next best hop for one or more customer endpoints having any of the identified IP address prefixes. Advancing to block 406, the IRR sends the generated route advertisement to the service node router.

At decision node 408, the IRR determines whether it is to signal the anycast router to pin up to a different service node. For example, the initial service node can fail, necessitating a pin up change in which the IRR signals the anycast router to pin up to a different service node. If the IRR determines that a pin up change is necessary, the method moves to block 410, and the IRR can select another service node, e.g., according to one or more load-balancing rules.

Proceeding to block 412, the IRR instructs the service node router at the initial service node to stop advertising that it is a next best hop for the customer endpoints communicating with the anycast router. Continuing to block 414, the IRR sends a route advertisement instructing another service node router associated with the other service node to send an advertisement to the network announcing that the other service node router is a next best hop for one or more customer endpoints having any of the identified IP address prefixes. The method can return to decision node 408.

Figure 5:
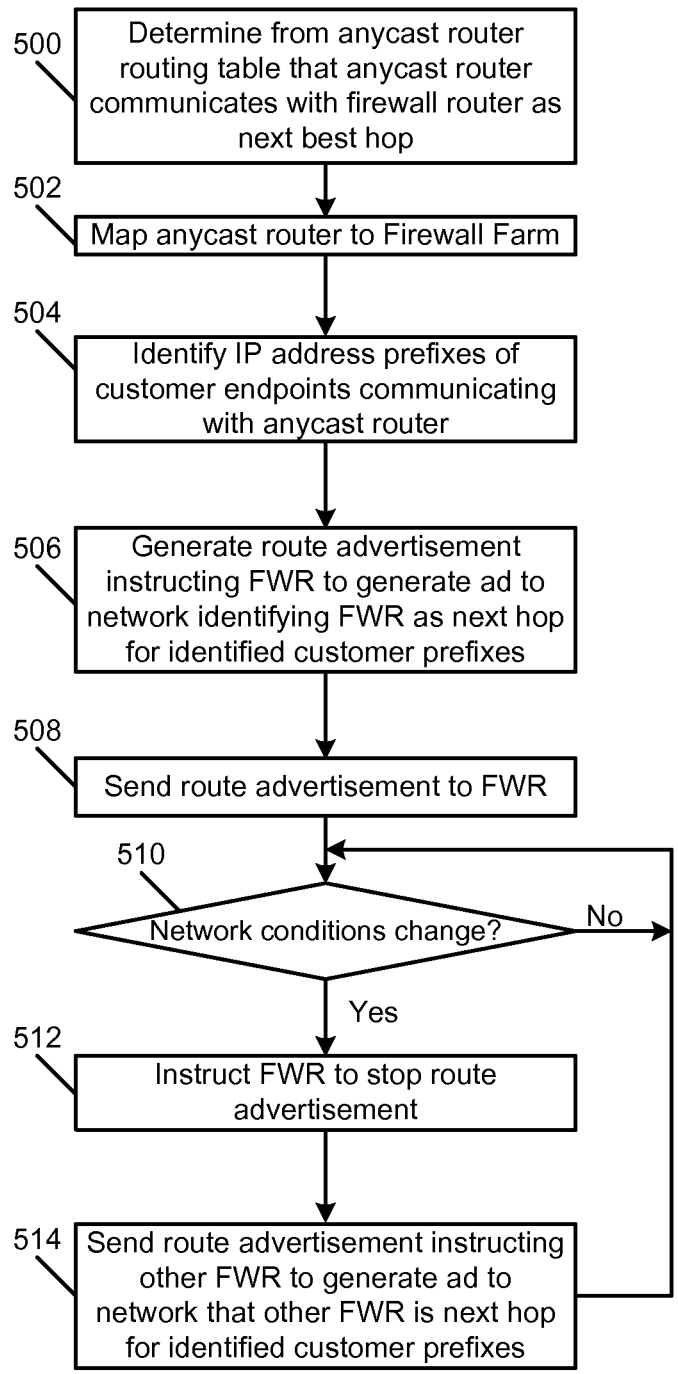
FIG. 5 is a flow diagram illustrating a second particular embodiment of a method of routing data in an anycast environment.

FIG. 5 is a flow diagram illustrating a second particular embodiment of a method of routing data in an anycast environment. At block 500, an intelligent route reflector device (IRR) determines that an anycast router is routing data from customer endpoints through an initial firewall farm as its nearest or best service node in a shared firewall service infrastructure. Moving to block 502, the IRR maps the anycast router to an initial firewall farm that includes the firewall router.

Proceeding to block 504, the IRR identifies IP address prefixes of customer endpoints communicating with the anycast router. Continuing to block 506, the IRR generates a route advertisement instructing a firewall router associated with the initial firewall farm to send an advertisement to the network announcing that the firewall router is a next best hop for one or more customer endpoints having any of the identified IP address prefixes. Advancing to block 508, the IRR sends the generated route advertisement to the firewall router.

At decision node 510, the IRR determines whether network conditions have changed, such that the anycast router is routing data from the customer endpoints through another firewall farm. If the IRR determines that such changes have occurred in network conditions, the method moves to block 512, and the IRR instructs the firewall router at the initial firewall farm to stop advertising that it is a next best hop for the customer endpoints communicating with the anycast router. Continuing to block 514, the IRR sends a route advertisement instructing another firewall router associated with the other firewall farm to send an advertisement to the network announcing that the other firewall router is a next best hop for one or more customer endpoints having any of the identified IP address prefixes. The method can return to decision node 510.

Figure 6:
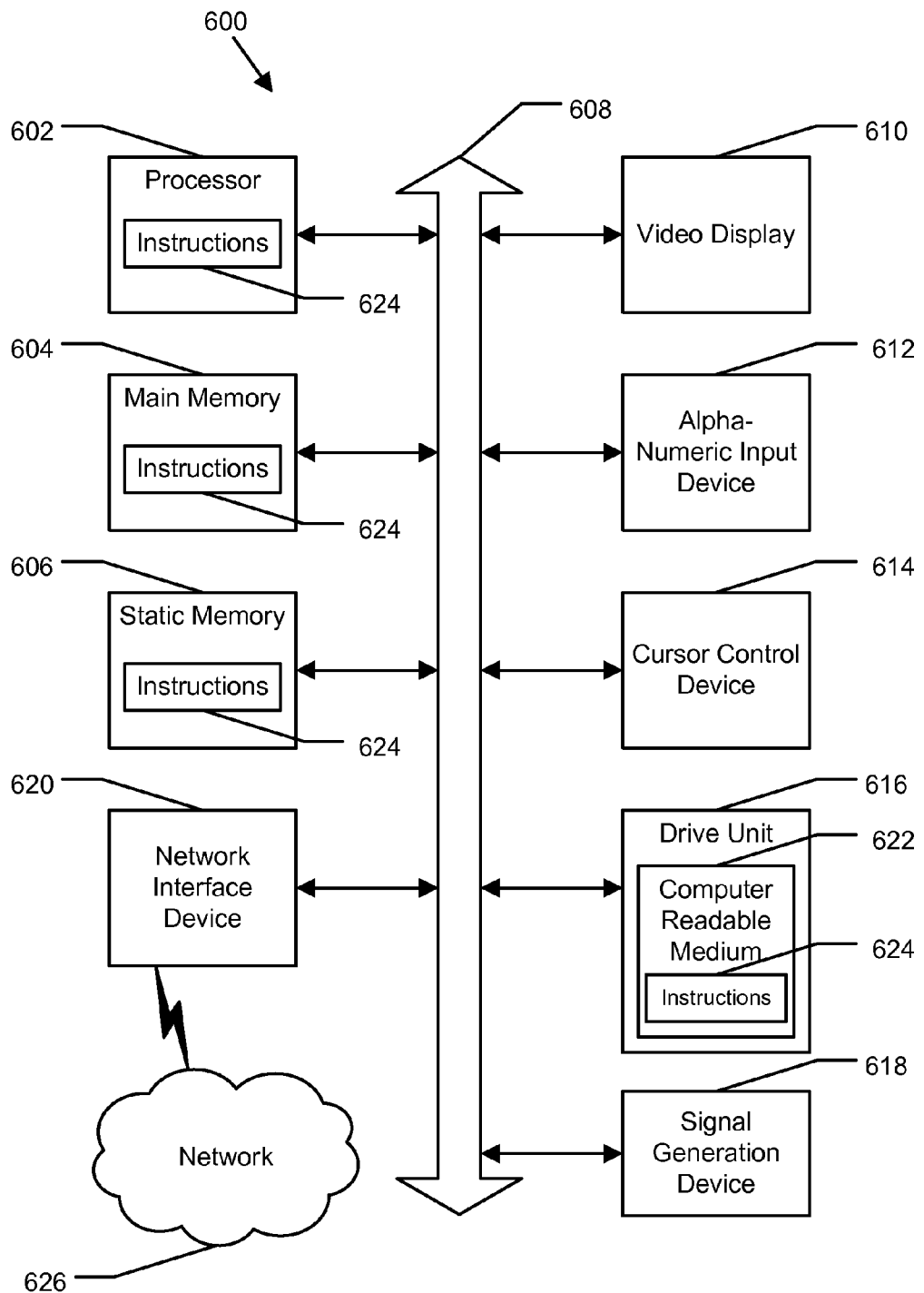
FIG. 6 is a block diagram illustrating a particular embodiment of a general computer system.

FIG. 6 is a block diagram illustrating a particular embodiment of a general computer system. The computer system 600 may operate as a standalone device or may be connected, e.g., using a network, to other computer systems or peripheral devices. In an illustrative embodiment, such standalone and peripheral devices can include, for example, anycast routers, firewalls, other service devices, firewall routers, other service node routers, customer endpoint devices, servers, intelligent route reflectors, other network elements, or any combination thereof, as illustrated in FIGS. 1-3.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with the embodiments disclosed herein, a system and method to route data in an anycast environment is provided. The disclosed system and method share the advantages of anycast infrastructures, by load-balancing traffic across various service nodes and routing data from customer endpoints to nearest or best service nodes. Additionally, however, the disclosed system and method provide symmetrical path control for stateful protocols, such as FTP, TCP, HTTP, VoIP, VPN, and other connection-oriented protocols for which anycast routing is typically disadvantageous. In the example of a shared firewall service, the disclosed system and method also relive users of manually configuring primary and backup firewalls, which can interrupt the load-balancing optimization of anycast routing and cause service black holes under certain failure conditions.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein, including Layer 4 stateful protocols running over IP, are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system for routing data in a network, the system comprising:
   a memory that stores instructions;
   a processor that executes the instructions to perform operations, the operations comprising:
      sending a first instruction to an anycast router associated with the network, wherein the first instruction signals the anycast router to statically route outbound traffic related to a network service to a first service node associated with an anycast address;
      instructing a service node router to send a router advertisement to the network announcing that the service node router is a next best hop for data traffic that is bound for customer endpoints having internet protocol addresses that include prefixes that communicate with the network via the anycast router; and
      sending a second instruction to the anycast router after detection of a change in a network condition of the network, wherein the second instruction signals the anycast router to route outbound traffic related to the network service to a second service node associated with the anycast address.

2. The system of claim 1, wherein the operations further comprise identifying the prefixes of the internet protocol addresses of the customer endpoints that communicate with the network via the anycast router.

3. The system of claim 1, wherein the operations further comprise detecting the change in the network condition.

4. The system of claim 1, wherein the operations further comprise instructing the service node router at the first service node to stop advertising that the service node router is the next best hop for the customer endpoints.

5. The system of claim 1, wherein the operations further comprise instructing a different service node router to send a different router advertisement to the network announcing that the different service node router is the next best hop for the data traffic that is bound for the customer endpoints having the internet protocol addresses that include the prefixes that communicate with the network via the anycast router.

6. The system of claim 1, wherein the operations further comprise selecting a different service node router when load-balancing conditions indicate that the service node router has reached a threshold capacity.

7. The system of claim 1, wherein the operations further comprise mapping the anycast router to the first service node.

8. The system of claim 1, wherein the operations further comprise monitoring the data traffic that is bound for the customer endpoints.

9. The system of claim 1, wherein the network conditions are selected from the group comprising load jitter, packet loss, and a time of day.

10. A method for routing data in a network, the method comprising:
    sending a first instruction to an anycast router associated with the network, wherein the first instruction signals the anycast router to statically route outbound traffic related to a network service to a first service node associated with an anycast address;
    instructing, by utilizing instructions stored in memory that are executed by a processor, a service node router to send a router advertisement to the network announcing that the service node router is a next best hop for data traffic that is bound for customer endpoints having internet protocol addresses that include prefixes that communicate with the network via the anycast router; and
    sending a second instruction to the anycast router after detection of a change in a network condition of the network, wherein the second instruction signals the anycast router to route outbound traffic related to the network service to a second service node associated with the anycast address.

11. The method of claim 10, further comprising identifying the prefixes of the internet protocol addresses of the customer endpoints that communicate with the network via the anycast router.

12. The method of claim 10, further comprising detecting the change in the network condition.

13. The method of claim 10, further comprising instructing the service node router at the first service node to stop advertising that the service node router is the next best hop for the customer endpoints.

14. The method of claim 10, further comprising instructing a different service node router to send a different router advertisement to the network announcing that the different service node router is the next best hop for the data traffic that is bound for the customer endpoints having the internet protocol addresses that include the prefixes that communicate with the network via the anycast router.

15. The method of claim 10, further comprising selecting a different service node router when load-balancing conditions indicate that the service node router has reached a threshold capacity.

16. The method of claim 10, further comprising mapping the anycast router to the first service node.

17. A computer-readable device having instructions, which when loaded and executed by a processor, cause the processor to perform operations comprising:
    sending a first instruction to an anycast router associated with the network, wherein the first instruction signals the anycast router to statically route outbound traffic related to a network service to a first service node associated with an anycast address;
    instructing a service node router to send a router advertisement to the network announcing that the service node router is a next best hop for data traffic that is bound for customer endpoints having internet protocol addresses that include prefixes that communicate with the network via the anycast router; and sending a second instruction to the anycast router after detection of a change in a network condition of the network, wherein the second instruction signals the anycast router to route outbound traffic related to the network service to a second service node associated with the anycast address.

18. The computer-readable device of claim 17, wherein the operations further comprise instructing the service node router at the first service node to stop advertising that the service node router is the next best hop for the customer endpoints.

19. The computer-readable device of claim 17, wherein the operations further comprise selecting a different service node router when load-balancing conditions indicate that the service node router has reached a threshold capacity.

20. The computer-readable device of claim 17, wherein the operations further comprise instructing a different service node router to send a different router advertisement to the network announcing that the different service node router is the next best hop for the data traffic that is bound for the customer endpoints having the internet protocol addresses that include the prefixes that communicate with the network via the anycast router.

* * * * *